United States Patent
Reddy

(10) Patent No.: US 8,792,254 B2
(45) Date of Patent: Jul. 29, 2014

(54) MULTILEVEL POWER CONVERTER AND METHODS OF MANUFACTURING AND OPERATION THEREOF

(75) Inventor: Raghothama Reddy, Murphy, TX (US)

(73) Assignee: General Electric Company, Schenectady, NY (US)

( * ) Notice: Subject to any disclaimer, the term of this patent is extended or adjusted under 35 U.S.C. 154(b) by 138 days.

(21) Appl. No.: 13/170,559

(22) Filed: Jun. 28, 2011

(65) Prior Publication Data
US 2013/0003431 A1 Jan. 3, 2013

(51) Int. Cl.
*H02M 3/335* (2006.01)
*H02M 5/42* (2006.01)

(52) U.S. Cl.
USPC .......................................... 363/21.02; 363/89

(58) Field of Classification Search
USPC ............. 363/125, 126, 127, 128, 129, 63, 64, 363/65, 66, 67, 68, 69, 71, 37, 16, 135, 89, 363/21.02
See application file for complete search history.

(56) References Cited

U.S. PATENT DOCUMENTS

| | | | |
|---|---|---|---|
| 4,520,437 A * | 5/1985 | Boettcher et al. ............... | 363/41 |
| 5,889,663 A | 3/1999 | Tabata et al. | |
| 6,658,730 B2 | 12/2003 | Harrison et al. | |
| 7,586,769 B2 | 9/2009 | Gaikwad et al. | |
| 7,986,535 B2 | 7/2011 | Jacobson et al. | |
| 8,063,621 B2 | 11/2011 | Harriman | |
| 8,085,015 B2 | 12/2011 | Lee | |
| 2004/0095790 A1 * | 5/2004 | Bakran et al. .................. | 363/132 |
| 2004/0233685 A1 * | 11/2004 | Matsuo et al. ................... | 363/65 |
| 2009/0040800 A1 * | 2/2009 | Sonnaillon et al. ............. | 363/89 |
| 2009/0231887 A1 * | 9/2009 | Ye et al. ...................... | 363/21.02 |
| 2011/0280052 A1 | 11/2011 | Al-Haddad et al. | |
| 2012/0074774 A1 | 3/2012 | King et al. | |
| 2012/0153878 A1 | 6/2012 | King et al. | |
| 2012/0153879 A1 | 6/2012 | King et al. | |

FOREIGN PATENT DOCUMENTS

| | | |
|---|---|---|
| CN | 201194372 Y | 2/2009 |
| JP | 2010172141 A | 8/2010 |

* cited by examiner

*Primary Examiner* — Matthew Nguyen
*Assistant Examiner* — Trinh Dang
(74) *Attorney, Agent, or Firm* — General Electric Company

(57) ABSTRACT

A power converter includes an input stage connected to receive a three phase AC input voltage and to provide multiple DC voltage levels. The power converter also includes an output stage of a plurality of interleaved LLC converters having series-connected inputs coupled to the multiple DC voltage levels and parallel-connected outputs to provide a DC output voltage. Additionally, the power converter includes a balancing circuit interconnected to the input and output stages to provide substantially balanced output currents from the plurality of interleaved LLC converters for the DC output voltage. Methods of manufacturing and operating a power converter are also provided.

21 Claims, 9 Drawing Sheets

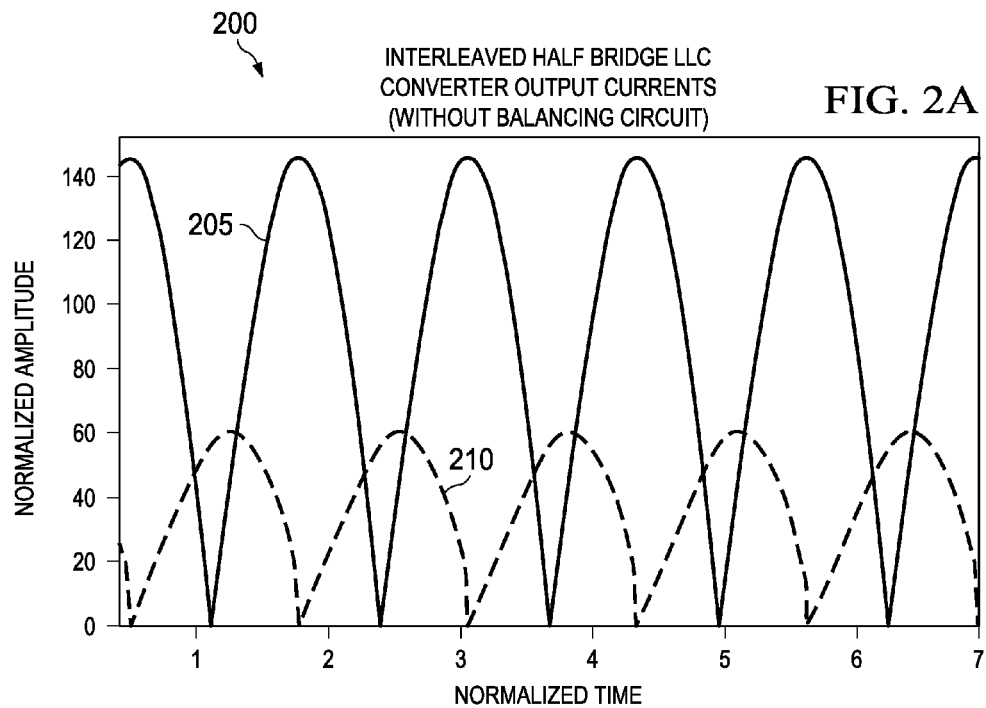
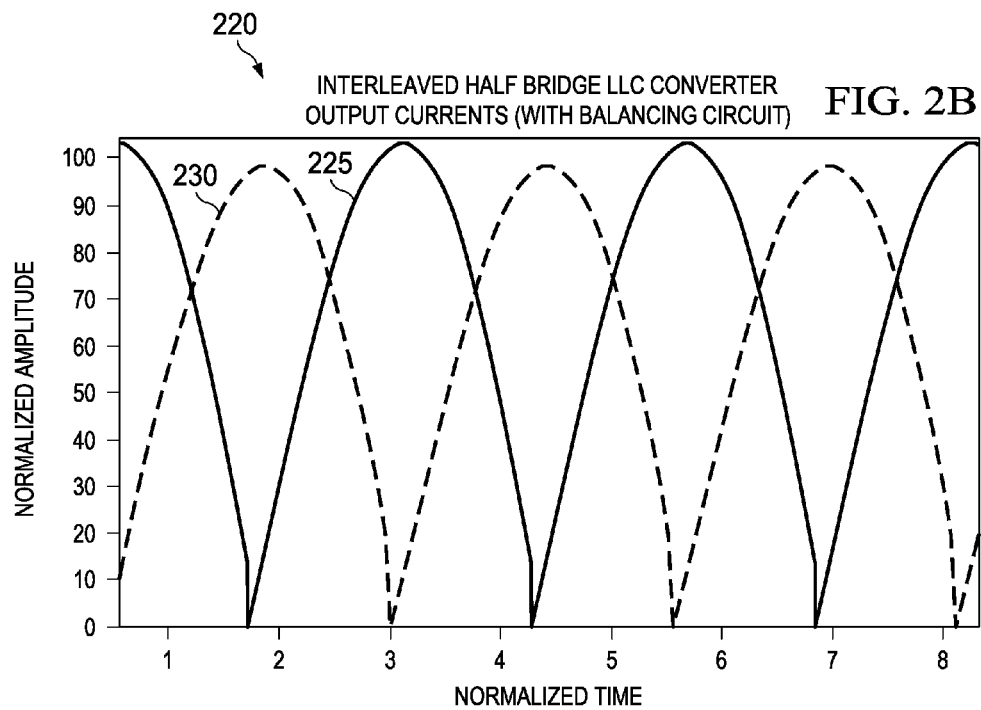

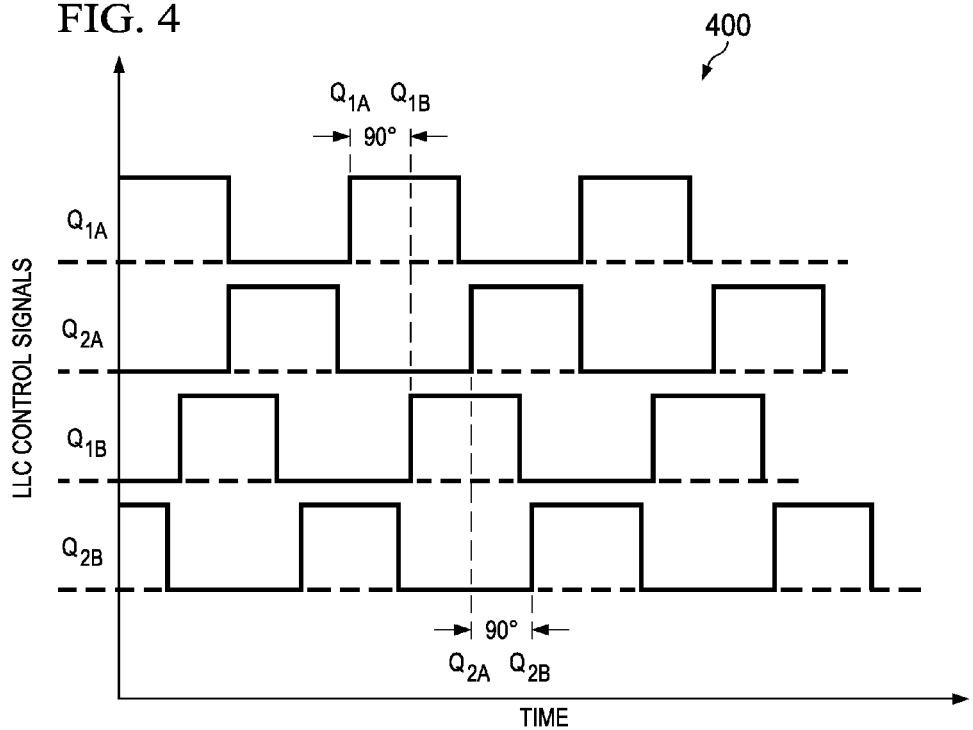
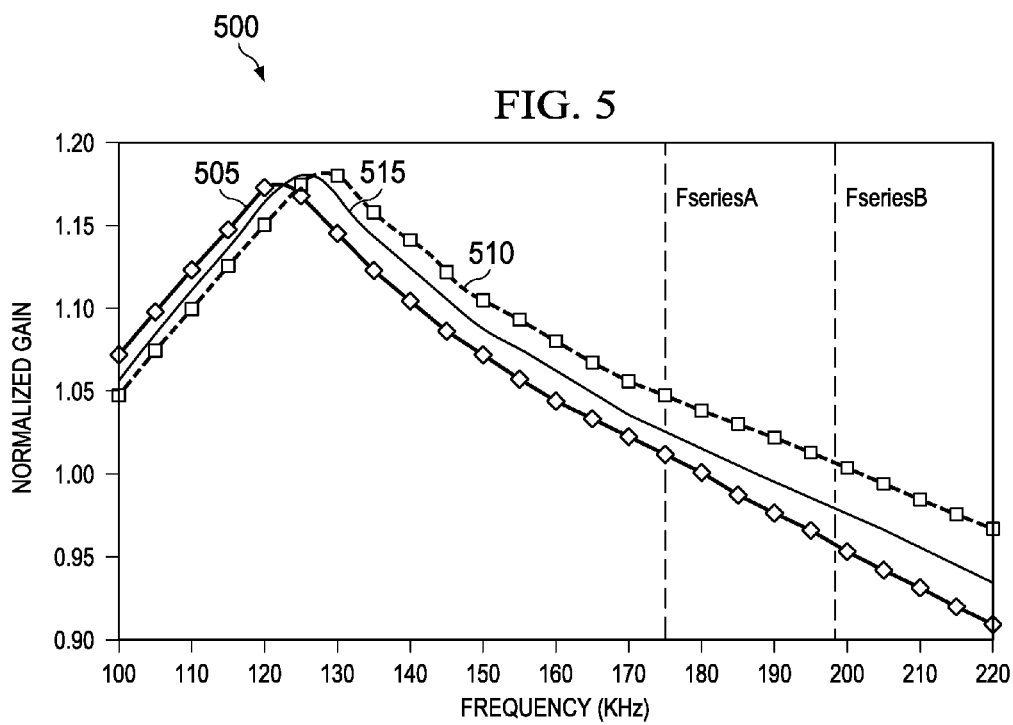

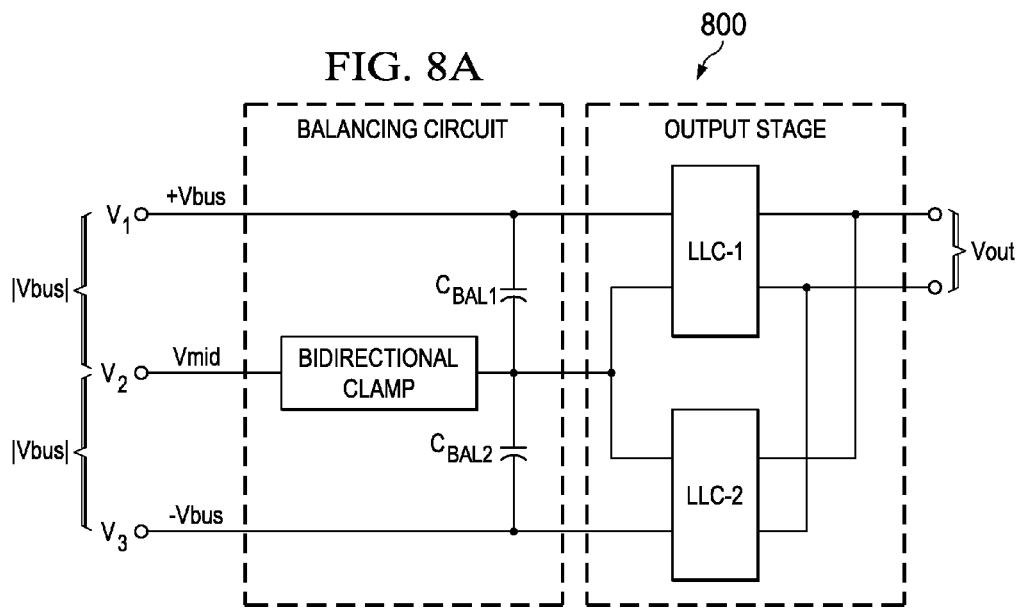
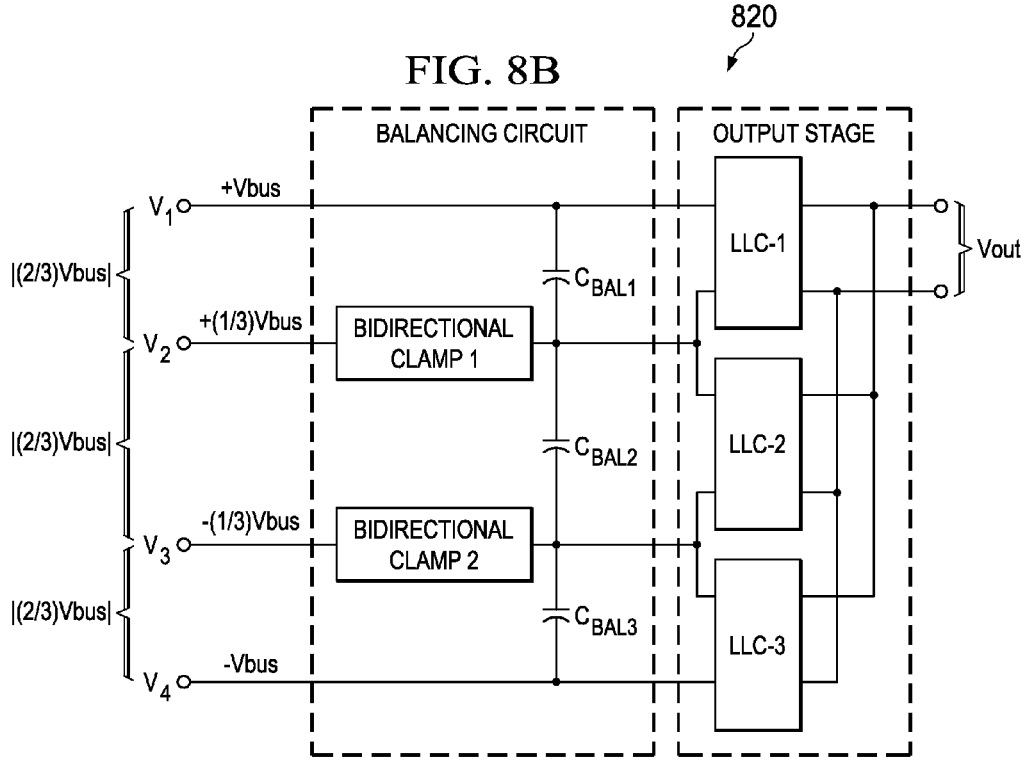

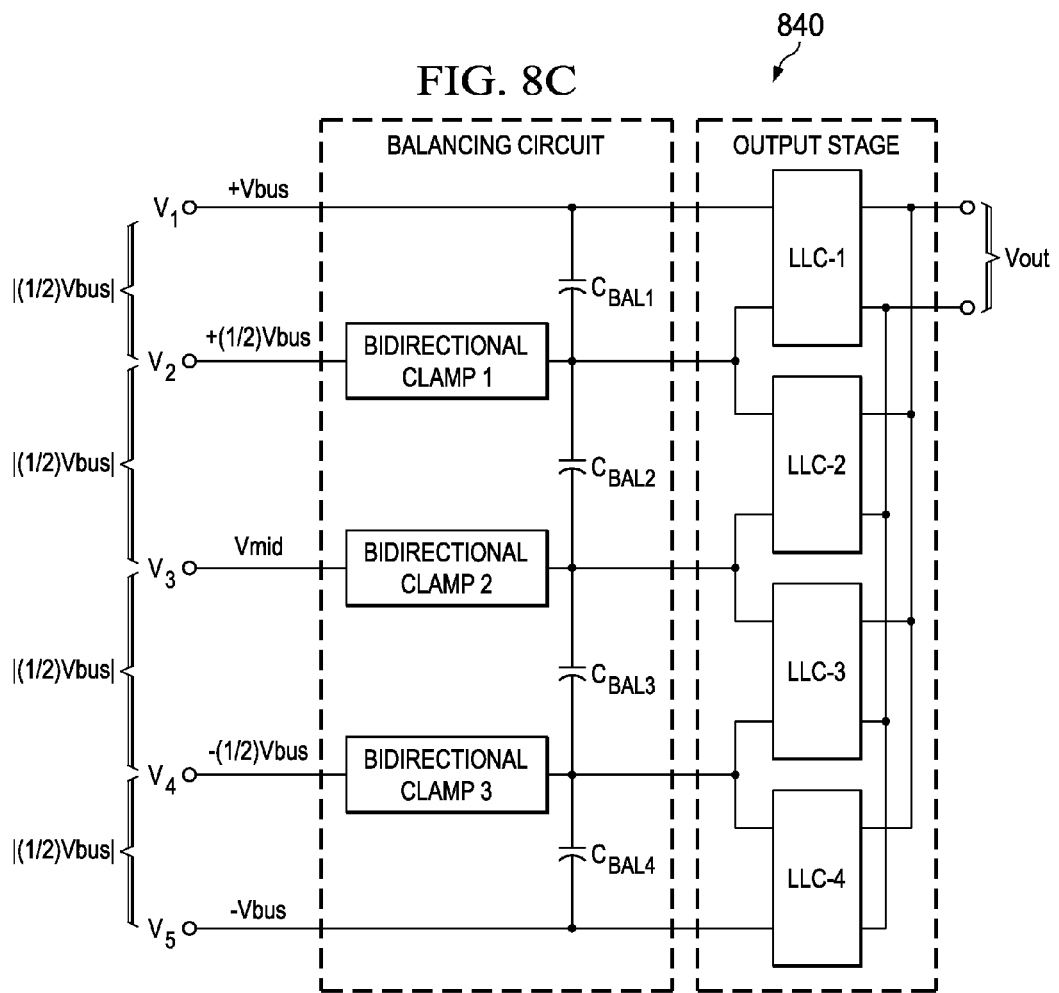

ously designated 100, constructed

MULTILEVEL POWER CONVERTER AND METHODS OF MANUFACTURING AND OPERATION THEREOF

TECHNICAL FIELD

This application is directed, in general, to power conversion and, more specifically, to a power converter, a method of manufacturing a power converter and a method of operating a power converter.

BACKGROUND

Inductor-inductor-capacitor (LLC) power converters are an increasingly important part of power conversion systems. LLC power converters have a number of advantages when compared to other power converters. These advantages may include zero voltage switching when cycling between a no-load to a full load on primary switches along with providing lower electromagnetic emissions. LLC power converters may also operate at higher switching frequencies than many other forms of power converters, which can in turn decrease the size of some LLC power converter components. However, disadvantages also arise when employing LLC power converters, especially when attempting to interleave two or more LLC power converters for a common output load. One particularly problematic disadvantage for interleaved LLC power converters includes differing load currents from a plurality of interleaved LLC power converters due to different component tolerances between the interleaved LLC power converters. Improvements in this area would prove beneficial to the art.

SUMMARY

Embodiments of the present disclosure provide a power converter as well as methods of manufacturing a power converter and operating a power converter.

In one embodiment, the power converter includes an input stage connected to receive a three phase AC input voltage and to provide multiple DC voltage levels. The power converter also includes an output stage of a plurality of interleaved LLC converters having series-connected inputs coupled to the multiple DC voltage levels and parallel-connected outputs to provide a DC output voltage. Additionally, the power converter includes a balancing circuit interconnected to the input and output stages to provide substantially balanced output currents from the plurality of interleaved LLC converters for the DC output voltage.

In another aspect, the method of manufacturing a power converter includes connecting an input stage to receive a three phase AC input voltage and provide multiple DC voltage levels. The method also includes constructing an output stage from a plurality of LLC converters having series-connected inputs coupled to the multiple DC voltage levels and parallel-connected outputs to provide a DC output voltage. Additionally, the method includes interconnecting a balancing circuit to the input and output stages to substantially balance output currents from the plurality of LLC converters for the DC output voltage.

In yet another aspect, the method of operating a power converter includes receiving a three phase AC input voltage and providing multiple DC voltage levels and generating a DC output voltage from parallel-connected outputs of a plurality of interleaved LLC converters having series-connected inputs coupled to the multiple DC voltage levels. The method also includes providing substantially balanced output currents from the plurality of interleaved LLC converters for the DC output voltage.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which:

FIGS. 2A and 2B illustrate examples of interleaved LLC converter output currents showing the impact of using a balancing circuit, such as the balancing circuit in FIG. 1;

FIG. 4 illustrates interleaved LLC converter control signals corresponding to the LLC converters of the output stage of FIG. 3;

FIG. 5 illustrates normalized gain curves corresponding to the interleaved LLC converters in the output stage of FIG. 3;

FIGS. 8A, 8B and 8C illustrate several voltage bus structures, output stages and balancing circuits relating to the extended power converter of FIG. 7 and constructed according to the principles of the present disclosure;

DETAILED DESCRIPTION

Figure 1:
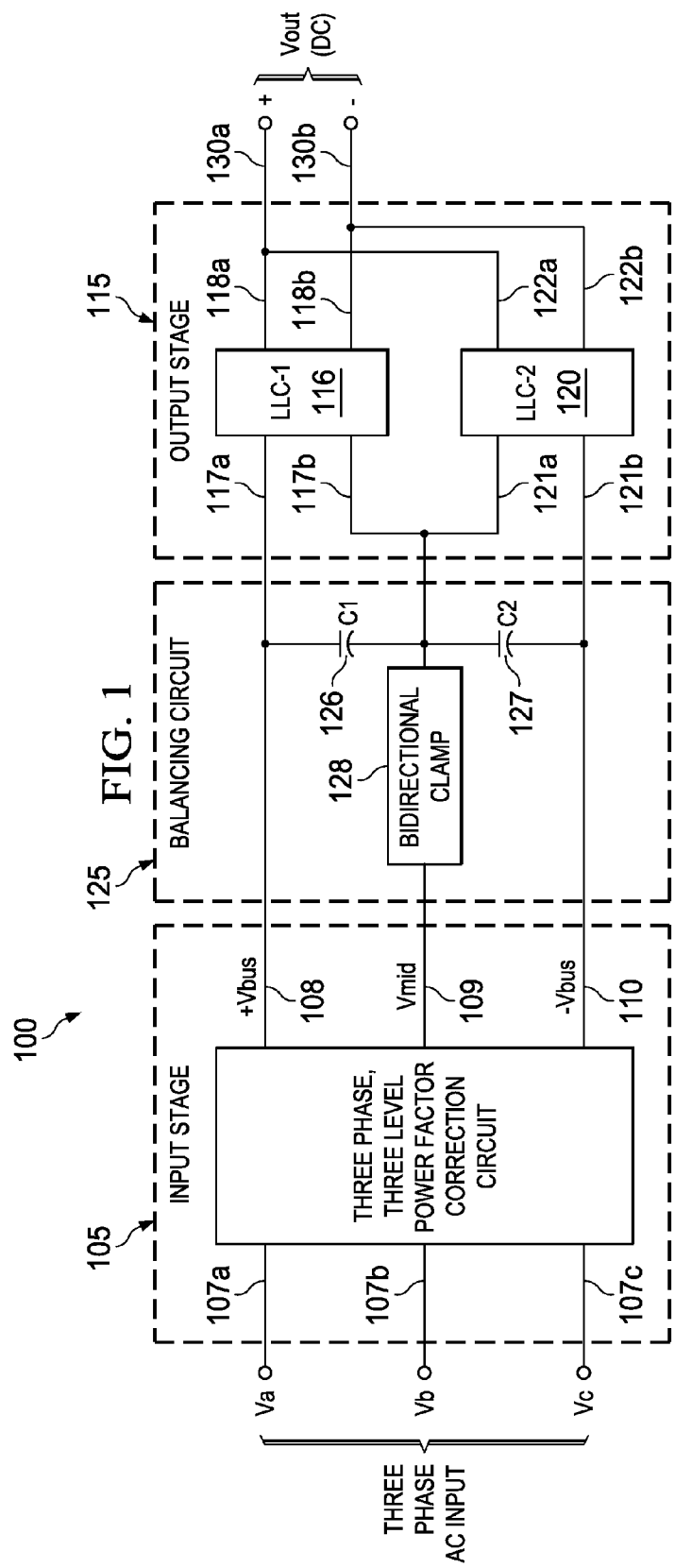
FIG. 1 illustrates a block diagram of an embodiment of a power converter constructed according to the principles of the present disclosure.

FIG. 1 illustrates a block diagram of an embodiment of a power converter, generally designated 100, constructed according to the principles of the present disclosure. The power converter 100 includes an input stage 105, an output stage 115 and a balancing circuit 125.

The input stage 105 is a three phase, three level power factor correction circuit having three inputs 107a, 107b, 107c connected to a three phase AC input voltage. The input stage 105 also includes an output having three levels 108, 109, 110 connected to provide multiple DC voltage levels as a positive DC bus voltage (+Vbus), a middle bus voltage (Vmid) and a negative DC bus voltage (−Vbus).

The output stage 115 includes first and second inductor-inductor-capacitor interleaved (LLC) converters 116, 120 having first and second series-connected inputs 117a, 117b, and 121a, 121b that are coupled to the multiple DC voltage levels of positive, middle and negative bus voltages +Vbus, Vmid and −Vbus. First and second parallel-connected outputs 118a, 118b and 122a, 122b provide a DC output voltage Vout.

The balancing circuit 125 is interconnected to the input and output stages 105, 115 and includes first and second balancing capacitors $C_{BAL1}$, $C_{BAL2}$ and a bidirectional clamp BDC connected between a junction of the first and second balancing capacitors $C_{BAL1}$, $C_{BAL2}$ and the middle bus voltage Vmid to provide substantially balanced output currents from the first and second interleaved LLC converters 116, 120 for the DC output voltage Vout.

FIGS. 2A and 2B illustrate examples of interleaved LLC converter output currents, generally designated 200 and 220, showing the impact of using a balancing circuit, such as the balancing circuit 125 in FIG. 1. The waveforms 200 of FIG. 2A show respective output currents 205, 210 from first and second interleaved half bridge LLC converters coupled to a common load and operating without a balancing circuit. It may be seen that the two output currents 205, 210 vary considerably resulting in a large output ripple and an inefficient operation.

In contrast, the waveforms 220 of FIG. 2B show respective output currents 225, 230 from first and second interleaved half bridge LLC converters coupled to a common load and operating with a balancing circuit according to the principles of the invention, such as the balancing circuit 125 of FIG. 1. Here, variation in the two output currents 225, 230 is seen to be greatly reduced from the output currents 205, 210 thereby reducing output ripple and enhancing operational efficiency.

Figure 3:
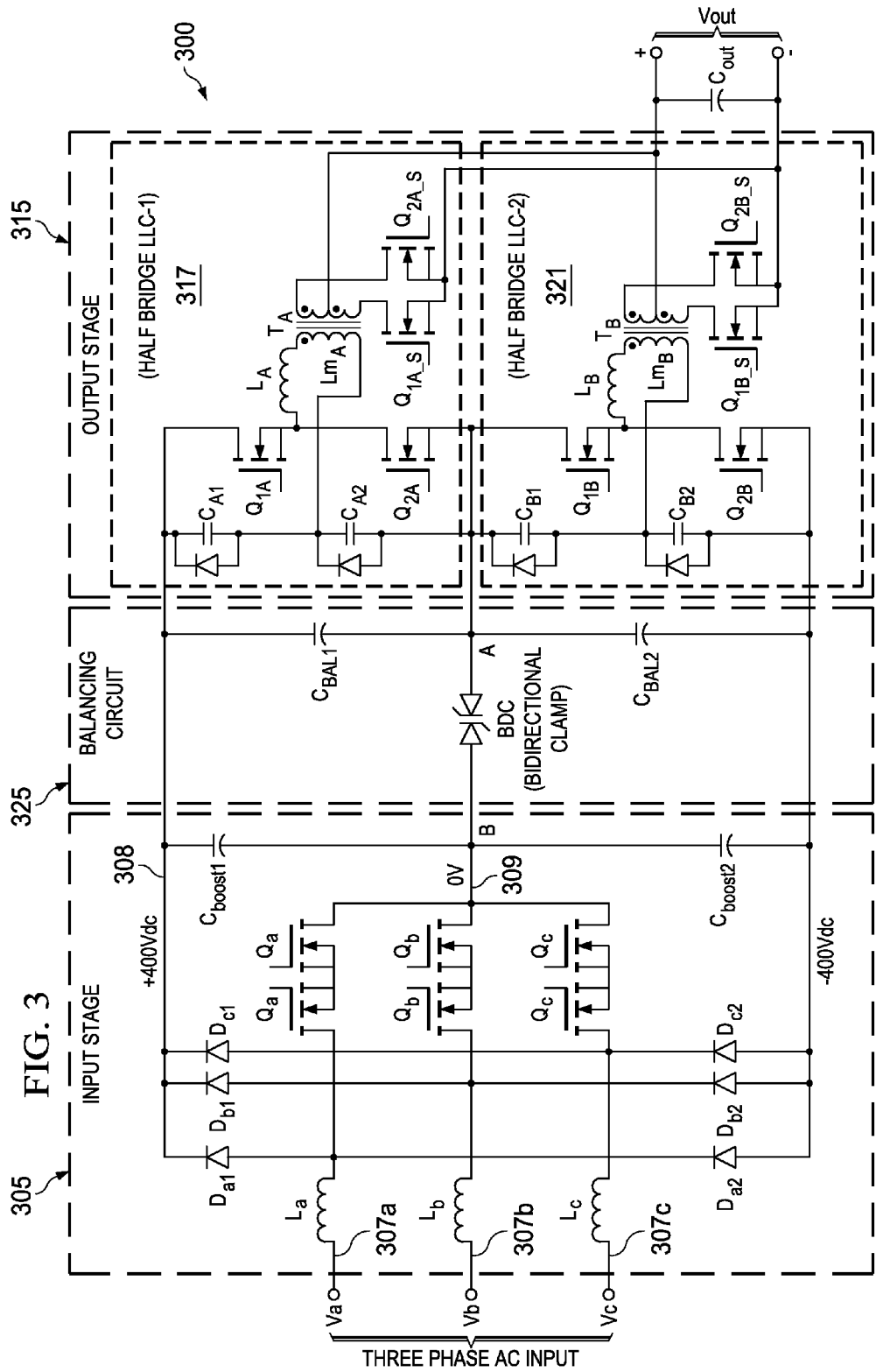
FIG. 3 illustrates a schematic of an embodiment of a power converter corresponding to the power converter shown in FIG. 1.

FIG. 3 illustrates a schematic of an embodiment of a power converter, generally designated 300, corresponding to the power converter 100 shown in FIG. 1. The power converter 300 includes an input stage 305, an output stage 315 and a balancing circuit 325.

The input stage 305 is a three phase, three level power factor correction circuit and includes three inputs 307a, 307b, 307c connected to three phase AC input voltages Va, Vb, Vc. The input stage 305 also includes an output having three levels 308, 309, 310 connected to provide multiple DC voltage levels as a positive DC bus voltage (+400 volts), a middle bus voltage (zero volts) and a negative DC bus voltage (−400 volts). The input stage 305 further includes input inductors La, Lb, Lc, positive voltage rectifiers $D_{a1}$, $D_{b1}$, $D_{c1}$, negative voltage rectifiers $D_{a2}$, $D_{b2}$, $D_{c2}$ and pairs of power switches independently controlled by input stage control signals Qa, Qb and Qc, as shown.

The output stage 315 includes first and second half bridge, interleaved LLC converters 317, 321 coupled together to provide an output voltage Vout and accommodate a common output load (not specifically shown). The first half bridge interleaved LLC converter 317 includes input capacitors $C_{A1}$, $C_{A2}$, a first input inductor $L_A$, a second input inductor $Lm_A$, a transformer $T_A$ and input and transformer control switches independently controlled by output stage control signals $Q_{1A}$ and $Q_{2A}$. Correspondingly, the second half bridge interleaved LLC converter 321 includes input capacitors $C_{B1}$, $C_{B2}$, a first input inductor $L_B$, a second input inductor $Lm_B$, a transformer $T_B$ and switches independently controlled by output stage control signals $Q_{1B}$ and $Q_{2B}$. The second input inductors $Lm_A$, $Lm_B$ are input magnetizing inductances for the transformers $T_A$, $T_B$, respectively.

The balancing stage 325 includes first and second balancing capacitors $C_{BAL1}$, $C_{BAL2}$ and a bidirectional clamp BCD. The first and second balancing capacitors $C_{BAL1}$, $C_{BAL2}$ are series connected between the positive and negative voltage levels of +400 volts and −400 volts and respectively connected to inputs of the first and second half bridge, interleaved LLC converters 317, 321, as shown. The bidirectional clamp BCD is connected between the junction of the first and second balancing capacitors $C_{BAL1}$, $C_{BAL2}$ (Node A) and the middle bus voltage of zero volts (Node B). In the illustrated embodiment, the bidirectional clamp BDC is a transorb (a transient voltage suppression diode). Other embodiments of the bidirectional clamp BDC may include one or more MOVs (metal oxide varistors), passive devices such as resistors or capacitors and active devices such as MOSFETs or diodes.

The input stage control signals Qa, Qb and Qc of the input stage 305 control the respective pairs of power switches to direct the three phase AC input voltages Va, Vb, Vc through the positive voltage rectifiers $D_{a1}$, $D_{b1}$, $D_{c1}$ and negative voltage rectifiers $D_{a2}$, $D_{b2}$, $D_{c2}$ to the provide and maintain the multiple DC voltage levels of +400, −400 and zero volts. The multiple DC voltage levels of +400 and zero volts are applied to the first half bridge interleaved LLC converter 317 employing the output stage control signals $Q_{1A}$ and $Q_{2A}$. Correspondingly, the multiple DC voltage levels of zero and −400 volts are applied to the second half bridge interleaved LLC converter 321 employing the output stage control signals $Q_{1B}$ and $Q_{2B}$.

The control signal $Q_{1A}$ activates its input control switch to connect the first input inductor $L_A$, the second input inductor $Lm_A$ (transformer $T_A$ input winding) and the input capacitor $C_{A2}$ between the multiple DC voltage levels of +400 and zero volts. Concurrently, control signal $Q_{1A}$ also activates its transformer control switch to provide a positive output current to a common output load (not shown).

Similarly, the control signal $Q_{2A}$ activates its input control switch to connect the first input inductor $L_A$, the second input inductor $Lm_A$ and the input capacitor $C_{A1}$ between the multiple DC voltage levels of zero and +400 volts. Concurrently, control signal $Q_{2A}$ also activates its transformer control switch to provide a positive output current to the common output load. The control signals $Q_{1A}$ and $Q_{2A}$ are mutually exclusive thereby prohibiting their respective input and transformer control switches from activating at the same time.

Correspondingly, the control signal $Q_{1B}$ activates its input control switch to connect the first input inductor $L_B$, the second input inductor $Lm_B$ (transformer $T_B$ input winding) and the input capacitor $C_{B2}$ between the multiple DC voltage levels of zero and −400 volts. Concurrently, control signal $Q_{1B}$ also activates its transformer control switch to provide a positive output current to the common output load.

Similarly, the control signal $Q_{2B}$ activates its input control switch to connect the first input inductor $L_B$, the second input inductor $Lm_B$ and the input capacitor $C_{B1}$ between the multiple DC voltage levels of −400 and zero volts. Concurrently, control signal $Q_{2A}$ also activates its transformer control switch to provide a positive output current to the common output load. The control signals $Q_{1B}$ and $Q_{2B}$ are mutually exclusive thereby prohibiting their respective input and transformer control switches from activating at the same time.

The output stage control signals $Q_{1A}$ and $Q_{1B}$ as well as $Q_{2A}$ and $Q_{2B}$ are phase shifted by 90 degrees, as shown in FIG. 4, to provide interleaving of the output currents of the first and second half bridge interleaved LLC converters 317, 321.

FIG. 4 illustrates interleaved LLC converter control signals, generally designated 400, corresponding to the LLC converters of the output stage 315 of FIG. 3. It may be seen in the control signals 400 that the control signals $Q_{1A}$ and $Q_{2A}$ are mutually exclusive, and the control signals $Q_{1B}$ and $Q_{2B}$ are also mutually exclusive. Additionally, the control signals $Q_{1A}$ and $Q_{1B}$ as well as $Q_{2A}$ and $Q_{2B}$ are phase shifted by 90 degrees.

Referring again to FIG. 3, ideally, the Node A would be maintained at approximately zero volts (the Node B) if there were no input component mismatches in the first and second half bridge interleaved LLC converters 317, 321. That is, if primarily there were no mismatches in input inductors $L_A$ and $L_B$ as well as input capacitors $C_{A1}$, $C_{A2}$, $C_{B1}$ and $C_{B2}$, the Node A would be maintained at approximately zero volts. However, mismatches in these components normally cause output currents from the first and second half bridge interleaved LLC converters 317, 321 to be different.

Series resonant frequencies may be calculated for the first and second half bridge interleaved LLC converters 317, 321, as shown below.

$$Fseries_A = \frac{1}{2\pi\sqrt{C_A L_A}}, \text{ and} \quad (1A)$$

$$Fseries_B = \frac{1}{2\pi\sqrt{C_B L_B}}. \quad (1B)$$

Normalized gain curves are plotted for equations 1A and 1B in FIG. 5 for the worst case mismatches shown below:
  $L_A$ and $C_A$ (+8% and +5% tolerances respectively), and
  LB and CB (−8% and −5% tolerances respectively).

FIG. 5 illustrates normalized gain curves, generally designated 500, corresponding to the interleaved LLC converters in the output stage 315 of FIG. 3. The normalized gain curves 500 include a first normalized gain curve 505 corresponding to $L_A$ and $C_A$ having a series resonant frequency $F_{seriesA}$ and a second normalized gain curve 510 corresponding to $L_B$ and $C_B$ having a series resonant frequency $F_{seriesB}$. The first and second normalized gain curves 505, 510 correspond to the worst case tolerance spread that would result without the balancing circuit 325. Operating in this mode (i.e., without a balancing circuit) would produce an output current that varies between the two normalized gain curves 505, 510. A balanced normalized gain curve 515 is representative of employing the balancing circuit 325.

Referring again to FIG. 3, the first and second balancing capacitors $C_{BAL1}$, $C_{BAL2}$ provide offsetting voltage compensation that result in a balanced normalized gain curve corresponding to the balanced normalized gain curve 515.

Figure 6:
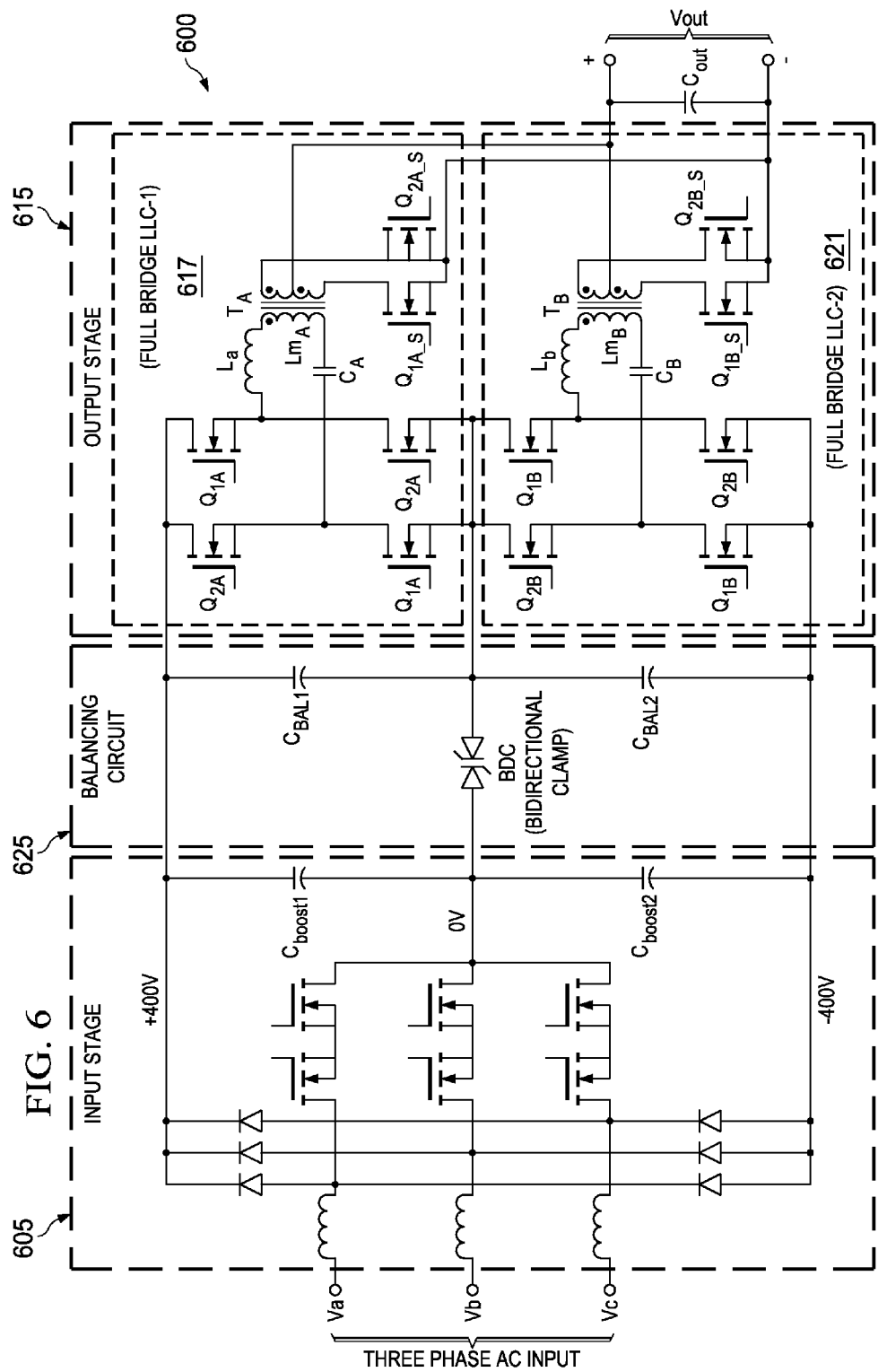
FIG. 6 illustrates a schematic diagram of another embodiment of a power converter corresponding to the power converter shown in FIG. 1.

FIG. 6 illustrates a schematic diagram of another embodiment of a power converter, generally designated 600, corresponding to the power converter 100 shown in FIG. 1. The power converter 600 includes an input stage 605, an output stage 615 and a balancing circuit 625. In this embodiment, the output stage 615 is a full bridge interleaved LLC converter instead of the half bridge interleaved LLC converter employed in FIG. 3. Generally, operation of the output stage 615 parallels the operation of the output stage 315 and operation of the power converter 600 parallels that of the power converter 300 of FIG. 3.

Figure 7:
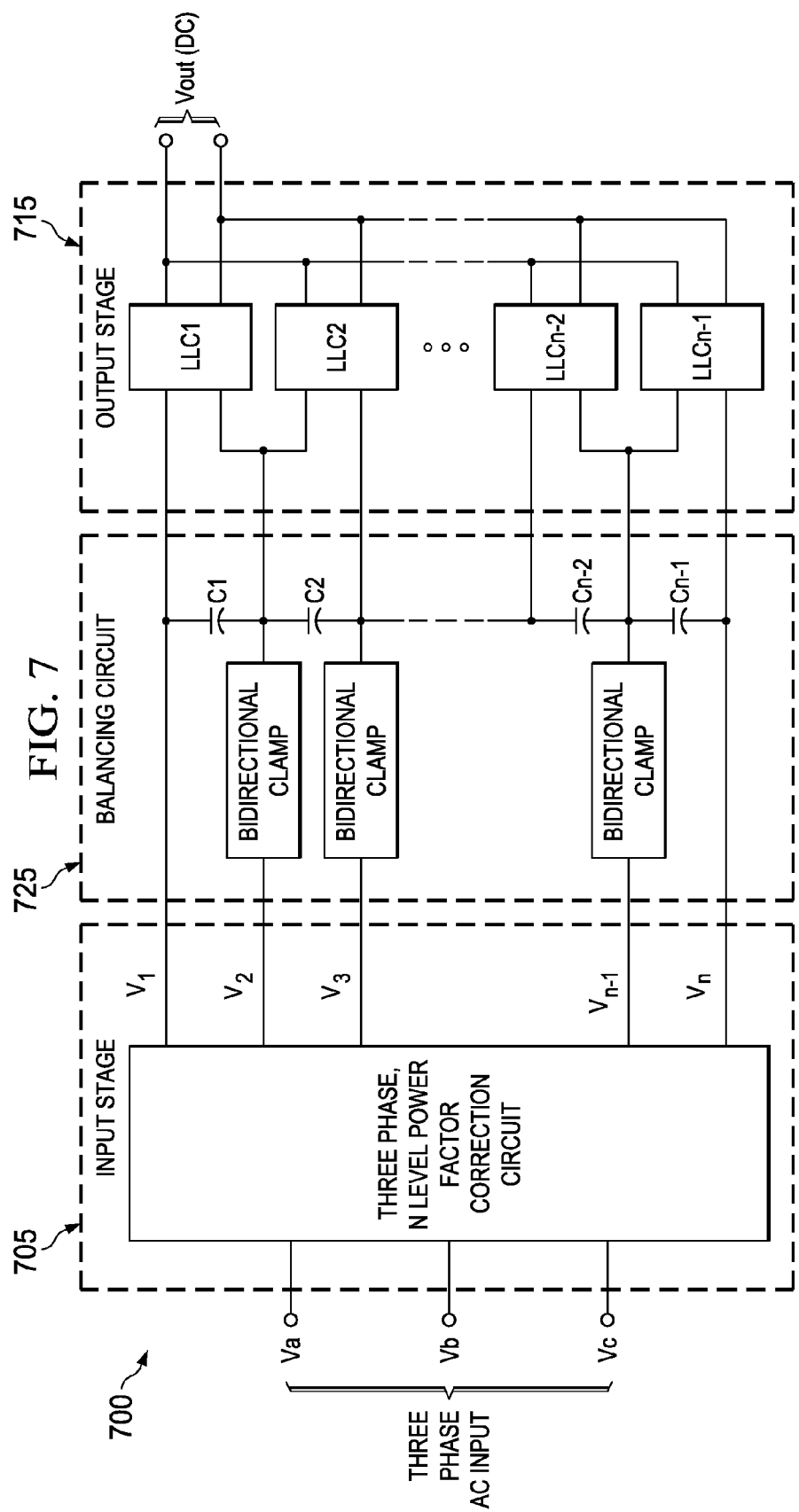
FIG. 7 illustrates a block of an embodiment an extended power converter constructed according to the principles of the present disclosure.

FIG. 7 illustrates a block of an embodiment an extended power converter, generally designated 700, constructed according to the principles of the present disclosure. The extended power converter 700 is a generalization of the power converter 100 of FIG. 1. The extended power converter 700 includes an input stage 705, an output stage 715 and a balancing circuit 725.

The input stage 705 is a three phase, N level power factor correction circuit having a three phase AC input and providing N levels corresponding to a multiple of N DC bus voltages. The output stage 715 employs a group of interleaved LLC converters that is dependent on the N levels. The balancing circuit 725 employs balancing capacitors and bidirectional clamps that are also dependent on the N levels. Generally, the balancing circuit 725 includes (N−1) balancing capacitors connected to (N−2) bidirectional clamps for (N−1) interleaved LLC converters connected to N DC voltage levels, where N is equal to at least three. Additionally, a nominal phase angle for each control signal of the (N−1) interleaved LLC converters corresponds to a phase angle of 180°/(N−1). N levels equal to three, four and five are described in more detail in FIG. 8.

FIGS. 8A, 8B and 8C illustrate several voltage bus structures, output stages and balancing circuits, generally designated 800, 820, 840, relating to the extended power converter 700 of FIG. 7 and constructed according to the principles of the present disclosure.

FIG. 8A corresponds to an N level of three and shows three bus voltages of +Vbus, Vmid (typically zero volts) and −Vbus. The voltage magnitude separating the bus voltages is seen to be |Vbus|. Of course, an output stage employs two (N−1) interleaved LLC converters having a control phase angle separation of 90 degrees (180 degrees/(N−1)). The balancing circuit employs two (N−1) balancing capacitors and one (N−2) bidirectional clamp.

FIG. 8B corresponds to an N level of four and shows four bus voltages of +Vbus, +(⅓)Vbus, −(⅓)Vbus and −Vbus. The voltage magnitude separating the bus voltages is |(⅔)Vbus|. An output stage employs three (N−1) interleaved LLC converters having a control phase angle separation of 60 degrees (180 degrees/(N−1)). The balancing circuit employs three (N−1) balancing capacitors and two (N−2) bidirectional clamps.

FIG. 8C corresponds to an N level of five and shows five bus voltages of +Vbus, +(½)Vbus, Vmid (typically zero volts), −(½)Vbus and −Vbus. The voltage magnitude separating the bus voltages is |(½)Vbus|. An output stage employs four (N−1) interleaved LLC converters having a control phase angle separation of 45 degrees (180 degrees/(N−1)). The balancing circuit employs four (N−1) balancing capacitors and three (N−2) bidirectional clamps. It may be generalized that odd values of N have Vmid voltage values that are typically zero, and even values of N have no Vmid voltage values.

Figure 9:
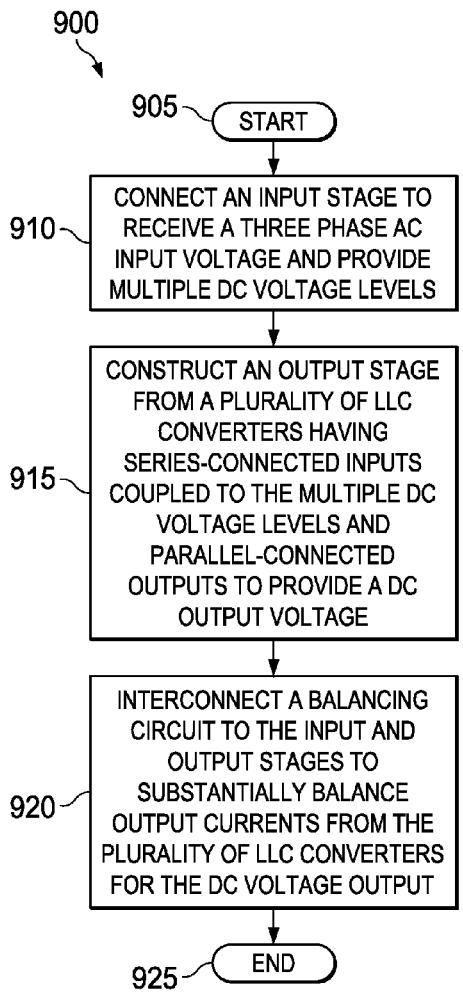
FIG. 9 illustrates a flow diagram of an embodiment of a method of manufacturing a power converter carried out according to the principles of the present disclosure.

FIG. 9 illustrates a flow diagram of an embodiment of a method of manufacturing a power converter, generally designated 900, carried out according to the principles of the present disclosure. The method 900 starts in a step 905 and then an input stage is connected to receive a three phase AC input voltage and provide multiple DC voltage levels, in a step 910. An output stage is constructed from a plurality of LLC converters having series-connected inputs coupled to the multiple DC voltage levels and parallel-connected outputs to provide a DC output voltage, in a step 915, and a balancing circuit is interconnected to the input and output stages to substantially balance output currents from the plurality of LLC converters for the DC output voltage, in a step 920.

In one embodiment, the balancing circuit includes a balancing capacitor for each of the plurality of LLC converters wherein the balancing capacitors are nominally equal in value. Additionally, the balancing circuit includes a bidirectional clamp connected between a junction of two balancing capacitors and one of the multiple DC voltage levels. Generally, the balancing circuit includes (N−1) balancing capacitors connected to (N−2) bidirectional clamps for (N−1) LLC converters connected to N DC voltage levels, for N equal to at least three. Also, a nominal phase angle for each control signal of the (N−1) LLC converters corresponds to a phase angle of 180°/(N−1).

In another embodiment, the balancing circuit includes a transorb. In yet another embodiment, the balancing circuit includes a bidirectional clamp employing one selected from the group consisting of a metal oxide varistor, a resistor or capacitor and a MOSFET or a diode. The method 900 ends in a step 925.

Figure 10:
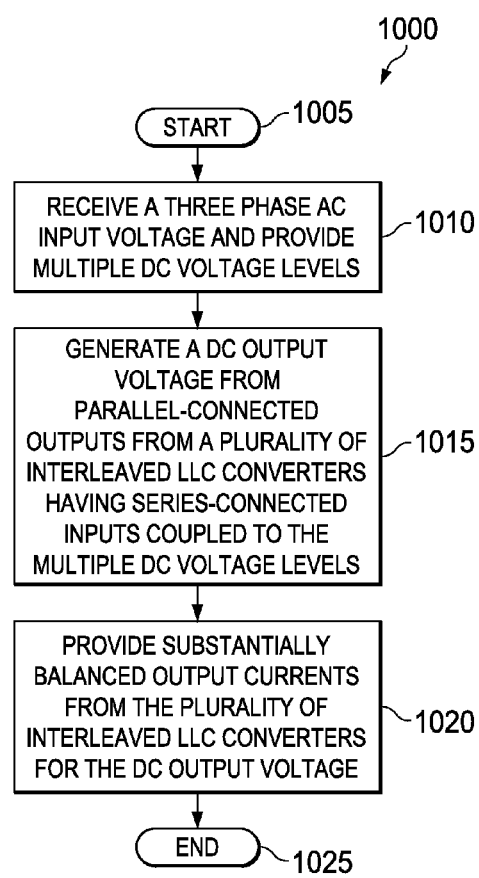
FIG. 10 illustrates a flow diagram of an embodiment of a method of operating a power converter carried out according to the principles of the present disclosure.

FIG. 10 illustrates a flow diagram of an embodiment of a method of operating a power converter, generally designated 1000, carried out according to the principles of the present disclosure. The method 1000 starts in a step 1005 and then, a three phase AC input voltage is received and multiple DC voltage levels are provided in a step 1010. A DC output voltage is generated from parallel-connected outputs of a plurality of interleaved LLC converters having series-connected inputs coupled to the multiple DC voltage levels, in a step 1015, and substantially balanced output currents are provided from the plurality of interleaved LLC converters for the DC output voltage, in a step 1020.

In one embodiment, the providing includes providing a balancing capacitor for each of the plurality of interleaved LLC converters wherein the balance capacitors are nominally equal in value. Additionally, the providing includes providing bidirectional clamping between a junction of two balancing capacitors and one of the multiple DC voltage levels. Generally, the providing, for N equal to at least three, includes providing (N−1) balancing capacitors and (N−2) bidirectional clamps for (N−1) interleaved LLC converters and N DC voltage levels and a nominal phase angle for each control signal of the (N−1) interleaved LLC converters corresponds to a phase angle of 180°/(N−1).

In another embodiment, the balancing circuit includes a transorb. In yet another embodiment, the balancing circuit includes a bidirectional clamp employing one selected from the group consisting of a metal oxide varistor, a resistor or capacitor and a MOSFET or a diode. The method 1000 ends in a step 1025.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

What is claimed is:

1. A power converter, comprising:
an input stage configured to receive a three phase AC input voltage and to provide multiple DC voltage levels;
an output stage of a plurality of interleaved LLC converters having series connected inputs coupled to the multiple DC voltage levels and parallel-connected outputs that provide a DC output voltage; and
a balancing circuit interconnected between the input stage and the output stage, the balancing circuit configured to provide substantially balanced output currents from the plurality of interleaved LLC converters to the DC output voltage, wherein the balancing circuit comprises at least two balancing capacitors and a bidirectional clamp connected between a junction of the at least two balancing capacitors and one of the multiple DC voltage levels.

2. The power converter of claim 1 wherein the balancing circuit includes a plurality of balancing capacitors, and each of said plurality of balancing capacitors is coupled with a respective one of the plurality of interleaved LLC converters.

3. The power converter of claim 1 wherein the at least two balancing capacitors are nominally equal in value.

4. The power converter of claim 1 wherein the balancing circuit includes a transorb.

5. The power converter of claim 1 wherein the balancing circuit includes a bidirectional clamp comprising at least one of:
a metal oxide varistor;
a resistor or capacitor; and
a MOSFET or a diode.

6. The power converter of claim 1 wherein the balancing circuit includes (N−1) balancing capacitors connected to (N−2) bidirectional clamps, wherein the balancing circuit is configured to provide substantially balanced output currents from (N−1) interleaved LLC converters connected to N DC voltage levels, for N equal to at least three.

7. The power converter of claim 6 wherein a nominal phase angle for each control signal of the (N−1) interleaved LLC converters corresponds to a phase angle of one hundred and eighty degrees divided by (N−1).

8. A method of manufacturing a power converter, comprising:
configuring an input stage to receive a three phase AC input voltage and provide multiple DC voltage levels;
constructing an output stage from a plurality of LLC converters, the output stage having series connected inputs coupled to the multiple DC voltage levels and parallel-connected outputs that provide a DC output voltage; and
interconnecting a balancing circuit between the input and output stages, the balancing circuit configured to substantially balance output currents from the plurality of LLC converters to the DC output voltage, wherein the balancing circuit comprises at least two balancing capacitors and a bidirectional clamp connected between a junction of the at least two balancing capacitors and one of the multiple DC voltage levels.

9. The method of claim 8 wherein the balancing circuit includes a plurality of balancing capacitors, wherein each of the plurality of balancing capacitors is coupled to a respective one of the plurality of LLC converters.

10. The method of claim 8 wherein the at least two balancing capacitors are nominally equal in value.

11. The method of claim 8 wherein the balancing circuit includes a transorb.

12. The method of claim 8 wherein the balancing circuit includes a bidirectional clamp comprising at least one of:
a metal oxide varistor;
a resistor or capacitor; and
a MOSFET or a diode.

13. The method of claim 8 wherein the balancing circuit includes (N−1) balancing capacitors connected to (N−2) bidirectional clamps, wherein the balancing circuit is configured to provide substantially balanced output currents from (N−1) interleaved LLC converters connected to N DC voltage levels, for N equal to at least three.

14. The method of claim 13 wherein a nominal phase angle for each control signal of the (N−1) LLC converters corresponds to a phase angle of one hundred and eighty degrees divided by (N−1).

15. A method of operating a power converter, comprising:
receiving a three phase AC input voltage and providing multiple DC voltage levels;

generating a DC output voltage from parallel-connected outputs of a plurality of interleaved LLC converters having series-connected inputs coupled to the multiple DC voltage levels; and providing substantially balanced output currents from the plurality of interleaved LLC converters for the DC output voltage, wherein providing substantially balanced output currents includes providing bidirectional clamping between a junction of at least two balancing capacitors and one of the multiple DC voltage levels.

16. The method of claim 15 wherein providing substantially balanced output currents includes providing a balancing capacitor for each of the plurality of interleaved LLC converters.

17. The method of claim 15 wherein the providing bidirectional clamping between a junction of at least two balancing capacitors includes providing at least two balancing capacitors that are nominally equal in value.

18. The method of claim 15 wherein the providing includes providing a balancing circuit using a transorb as the bidirectional clamp.

19. The method of claim 15 wherein the providing includes providing a balancing circuit having a bidirectional clamp comprising at least one of:
- a metal oxide varistor;
- a resistor or capacitor; and
- a MOSFET or a diode.

20. The method of claim 15 wherein the providing substantially balanced output current includes, for N equal to at least three, providing (N−1) balancing capacitors and (N−2) bidirectional clamps for (N−1) interleaved LLC converters and N DC voltage levels.

21. The method of claim 20 wherein a nominal phase angle for each control signal of the (N−1) interleaved LLC converters corresponds to a phase angle of one hundred and eighty degrees divided by (N−1).

* * * * *